United States Patent [19]
Klieber

[11] Patent Number: 5,390,564
[45] Date of Patent: Feb. 21, 1995

[54] BICYCLE HANDLEBAR

[76] Inventor: Jochen Klieber, Dammweg 1, 8221 Tacherting, Germany

[21] Appl. No.: 193,901

[22] Filed: Feb. 9, 1994

Related U.S. Application Data

[63] Continuation of Ser. No. 836,066, Feb. 12, 1992, abandoned.

[30] Foreign Application Priority Data

Feb. 27, 1991 [DE] Germany ............................ 4106154

[51] Int. Cl.⁶ .............................................. B62K 21/12
[52] U.S. Cl. ................................... 74/551.1; D12/178; 74/551.8
[58] Field of Search ............................ 74/551.1–551.8; D12/178, 111

[56] References Cited

U.S. PATENT DOCUMENTS

| | | | |
|---|---|---|---|
| D. 30,971 | 6/1899 | Metz | D12/178 |
| D. 301,027 | 5/1989 | Borromeo | D12/178 |
| 4,462,267 | 7/1984 | Shimano | D12/178 X |
| 4,503,729 | 3/1985 | Shimano | 74/551.1 X |
| 4,829,847 | 5/1989 | Modolo | 74/551.1 OR |
| 5,024,119 | 6/1991 | Linden | 74/551.1 OR |
| 5,083,476 | 1/1992 | Borromeo | D12/178 X |
| 5,131,289 | 7/1992 | Vansandt | 74/551.1 X |

Primary Examiner—Vinh T. Luong
Attorney, Agent, or Firm—Tilton, Fallon, Lungmus & Chestnut

[57] ABSTRACT

A bicycle handlebar comprising a substantially horizontal extension connection piece and at least two handlebar portions disposed symmetrically on respectively both sides of the extension connection piece. The handlebar portions are designed as an upper handlebar grip portion adjacent to the extension and a lower handlebar portion adjoining it.

The upper handlebar grip portion extends rearwardly and downwardly relative to the extension connection piece and is connected with the substantially forwardly and upwardly extending lower handlebar grip portion via an outwardly and forwardly extending curved member to improve the hand positions with the corresponding handlebar grips and for the ergonomical design of the same and for the additional arrangement of an aero-type handlebar.

38 Claims, 6 Drawing Sheets

BICYCLE HANDLEBAR

This is a continuation of application Ser. No. 07/836,066, filed on Feb. 12, 1992, now abandoned.

FIELD OF THE INVENTION

The invention relates to a bicycle handlebar comprising a substantially horizontal extension connection piece and at least two handlebar portions symmetrically disposed on respectively both sides of the extension connection piece, the first portion adjacent to the extension and extending outwardly being designed as upper handlebar grip and the second portion adjoining it being designed as lower handlebar grip.

BACKGROUND OF THE INVENTION

Such a bicycle handlebar is, e.g. known in the form of a racing-type handlebar. In the same, the upper handlebar grip portion is connected with the lower handlebar grip portion via a forwardly and downwardly extending curved member. At least two grip positions are, in principle, possible with this handlebar. In the case of the upper handlebar grip, the respective upper handlebar grip portion is grasped with the hands and in the case of the lower handlebar grip a corresponding portion of the lower handlebar grip is grasped.

In this known racing-type handlebar it is disadvantageous that the upper handlebar grip portion extending in straight fashion and in horizontal direction is only relatively poorly suited for an anatomically favourable posture of the hand. The forearm is inwardly twisted, as compared with a relaxed forearm position, so that the hand can grasp the upper handlebar grip. This is uncomfortable for the rider and tiring in the long run. Due to the twisting of the forearm, the muscles, in particular the biceps can furthermore not be used very well for bringing the forearm up to the upper arm upon the influence of force on the racing-type handlebar.

Due to the posture of the forearm, the elbows furthermore project out of the contour of the body, if the handlebar is subjected to pulling in order to exert pressure on the saddle and the pedals, which leads to worse aerodynamics.

It is furthermore of disadvantage that, in the case of a simultaneous attachment of an aero-type handlebar to the racing-type handlebar, which is normally fastened to the horizontal and straight upper handlebar grip portion, there is only little space between aero-type handlebar and racing-type handlebar, and the hands have consequently no space near the attachment.

It is furthermore of disadvantage in the lower handlebar grip that the body weight slightly bends the wrist inwardly. This leads to a high strain both of the wrist and of the hand itself. The sensation of numb fingers may even occur. In both grip positions the force arc for the force transmissions from the foot via the back to the hand is not effected in a line being as straight as possible, but via a partly bent line, and is thus disadvantageous.

In a further bicycle handlebar, the so-called horn-type handlebar, the upper handlebar grip portion extends in straight and horizontal fashion or in forwardly and downwardly inclined fashion. It is connected to the lower handlebar portion via a forwardly extending curved member. As opposed to the racing-type handlebar, the lower handlebar portion is disposed substantially in the same plane as the upper handlebar grip portion and does not really extend below the same. The lower handlebar portion extends in curved fashion forwardly and upwardly at the ends. The disadvantages in the upper handlebar grip correspond to that of the racing-type handlebar in the horn-type handlebar. It is similar with the lower handlebar grip, because the forwardly and upwardly projecting horns are grasped by the hands in the case of the same and lead substantially to the same problems as in the lower handlebar grip of the racing-type handlebar.

SUMMARY OF THE INVENTION

Therefore, the present invention is based on the object to improve the grip positions for the hands in a bicycle handlebar of the type mentioned at the beginning and to design it in particular ergonomically. The grip positions are to be designed in such fashion at the same time that, e.g. a projecting of the elbows from the body contour is prevented. The use of an aero-type handlebar is to be unlimited, it being in particular possible to dispose the arm supports in an aerodynamically favourable position above the upper handlebar grip portion.

This object is accomplished in a bicycle handlebar with the features of the preamble of claim 1 by the fact that the upper handlebar grip portion extends rearwardly and downwardly relatively to the extension connection piece and the upper handlebar grip portion is connected to the lower handlebar grip portion which extends substantially forwardly and upwardly via a curved member which extends outwardly and forwardly.

Due to the fact that the upper handlebar grip portion is rearwardly and downwardly inclined directly from the extension connection piece, the forearm of a rider must no longer be inwardly twisted. The arm remains in a relaxed basic position with the hand twisted slightly outwardly. Due to this, a better use of the muscles and a better force transmission is achieved. Also, if the forearm approaches the upper arm, it can be guided at the body and the elbow does not project from the body contour. Thus, an aerodynamically advantageous, smaller front surface of the rider results without arms being in the head wind, particularly for rapid rides.

The aero-type handlebar can moreover be attached directly to the extension connection piece without hampering the hands of the rider in the upper handlebar grip. There is sufficient space between aero-type handlebar and upper handlebar due to the bend of the upper handlebar grip portion.

It is furthermore of advantage that the lower handlebar grip portion is easily accessible from above. Due to the open construction of the bicycle handlebar there is also a certain resilient effect thanks to the open legs. A bending of the wrists in the lower handlebar grip is also practically prevented, since the curved member extending outwardly and forwardly and the parts of the upper handlebar section adjacent to the curved member serve as a lateral abutment of the forearm. The wrist can be held substantially in straight fashion by means of this guiding of the forearm.

The force arc extends from the hand via the back to the foot without "twisted" extremities in the upper handlebar grips and a better force transmission, and thus a faster riding, is possible.

In order to make a further favorable grip position possible, it is advantageous if the upper handlebar grip portion encloses in each case a substantially straight upper holding grip element and the lateral holding grip element, the lateral holding grip element extending downwardly at an angle to the horizontal plane which is greater than the upper holding grip element. The upper holding grip element makes it possible in the known upper handlebar grip which is e.g. used for an uphill ride in the saddle, while the lateral holding grip element makes a so-called "crawling grip" possible, with which a relatively relaxed riding at lower speeds is possible. Due to the arrangement of the lateral holding grip element the wrist is also not overstretched at this grip position and the forearm is disposed in a relaxed, non-twisted position.

In this connection it is in particular advantageous if the upper holding grip element has in each case curved ends for connection with the extension connection piece and the lateral holding grip element. Due to the curved ends, a continuous transition between upper holding grip element and lateral holding grip element or extension connection piece results. The curvatures are designed in such fashion that they can in particular be partly grasped at the lateral holding grip element.

In another embodiment of the invention the curved member can directly be disposed on a curved end of the upper holding grip element. The curved member is forwardly bent over a narrow curvature, a substantially straight lower handlebar grip portion adjoining it.

In order to align the grip on the upper handlebar exactly to the hand position, it is furthermore of advantage if the end bend allocated to the extension connection piece is rotated clockwise about a longitudinal axis of the upper holding grip element with respect to the end bend allocated to the lateral holding grip element.

It is furthermore favorable if the end bend with the longitudinal axis of a partial portion of the upper holding grip element, which extends in straight fashion, enclose a substantially equal angle. In this fashion, upper holding grip element and lateral holding grip element are well accessible and adapted to the various grip positions.

It is especially favorable for the hand position and the forearm basic position if the longitudinal axis extends downwardly with respect to the horizontal plane at an angle of 34° to 40°, preferably 37°. These and the following angle indications are rough indications. Deviations of some degrees upwards or downwards are possible.

It is furthermore advantageous to support the hand in the lateral holding grip and to improve the transition to the curved member, if the lateral holding grip element has an end bend extending outwardly and allocated to the curved member.

For the better grasping of the lateral holding grip element together with an end bend of the upper holding grip element, it is advantageous if the lateral holding grip element extends substantially rectilinearly in the direction given by the end bend of the upper holding grip element, which is allocated to it.

For the good accessibility of the lower handlebar it is moreover favorable if the curved member is substantially disposed in a plane extending at an angle to the horizontal plane in accordance to the end bend of the lateral holding grip element. In addition to the good accessibility of the lower handlebar grip portion, an advantageous abutment of the forearm is at the same time also possible in a lower handlebar grip position. In this connection it is advantageous if the curved member is flattened (ovalized) in the direction of this plane to offer the forearm a still larger contact surface for support.

In order to further improve a bending of the wrist in the lower handlebar grip and additionally the abutment of the forearm on the upper handlebar it is advantageous if the end of the curved member allocated to the lower handlebar grip portion is disposed pointing forwardly and inwardly.

In this connection it is furthermore favorable if the end of the curved member is upwardly directed with respect to the horizontal plane at an angle of 5° to 10° preferably 8°.

In order to make furthermore different grip positions possible, also by means of the lower handle bar grip portion, it is in this connection advantageous if the lower handlebar grip portion comprises at least one sprint-type holding grip element and a lower handlebar holding grip element, the sprint-type holding grip element being connected with it in continuation of the curved member and the lower handlebar holding grip element being connected with the sprint-type holding grip element extending upwardly at a greater angle with respect to the horizontal plane. The lower handlebar grip portion can be grasped by a rider in simple fashion by means of the sprint-type holding grip element, if the rider leaves the saddle for acceleration purposes and the arms are substantially not directed in longitudinal direction of the bicycle, but upwardly almost vertically to it. The lower handlebar holding grip element can be grasped in simple fashion by the rider during a rapid ride in the saddle, it being also possible that the forearm can abut on the upper handlebar in this grip position to avoid a bending of the wrist.

In this connection it is furthermore of advantage if the sprint-type holding grip element and the lower handlebar holding grip element are substantially disposed in a lower handlebar plane bent inwardly with respect to a central plane of the extension connection piece extending in the riding direction. Due to the forwardly bent arrangement the forearm rests on the upper handlebar, and, at the same time, an aerodynamically favorable posture in particular of the arms and shoulders results. An arrangement of the two holding grip elements extending approximately in parallel to the riding direction is, however, also possible.

In this connection it is in particular favorable if the lower handlebar plane encloses approximately an angle of 0° to 16° with the central plane.

So that grip positions being as favorable as possible on the lower handlebar can be adopted, it is furthermore advantageous if the sprint-type holding grip element extends upwardly substantially at the same angle as the end of the curved member with respect to the horizontal plane, and the lower handlebar holding grip element extends upwardly at an angle of 30° to 40°, preferably 35°, relative to the sprint-type holding grip element.

In order to make a simple arrangement of a hand braking lever possible, it is favorable to dispose a braking lever support element on the end of the lower handlebar holding grip element opposite to the sprint-type holding grip element. This arrangement of the braking lever support element is also possible in the embodiment of the invention without lateral holding grip element.

So that it is possible to grasp the braking lever well in the lower handlebar holding grip, it is favorable that the radius of curvature of the connection between the sprint-type holding grip element and the lower handlebar grip element is equal to or greater than the radius of curvature of the connection between braking lever holding element and lower handlebar holding grip element.

The grasping of the hand braking lever is furthermore facilitated by the fact that the braking lever support element is disposed in the lower handlebar plane.

In order to be able to mount the braking lever support in correct horizontal position and in rising position and to avoid at the same time an overstretched wrist upon the grasping of the braking lever, it proves to be favorable if the braking lever support element points upwardly with its free end and is rearwardly inclined to a vertical at an acute angle.

So that the hand braking lever can also be grasped by the hand with the forearm resting on the upper handlebar it is favorable if the braking lever support element is disposed at a greater distance to the central plane with respect to the lateral holding grip element.

In order to ensure in general a good grip position it proves to be advantageous if the upper holding grip element and/or the lateral holding grip element and/or the sprint-type holding grip element and/or the lower handlebar holding grip element have a length corresponding approximately to the width of a hand. If, curvatures connecting the individual grip-elements can simultaneously also be grasped, the length of the grip elements may also be designed smaller than the width of a hand.

In an embodiment of the invention the partial section of the upper holding grip element is slightly bent downwardly between the associated end bends. In order to be able to grasp the hand braking lever also from above, in particular from a grip position on the upper handlebar, it is of advantage if a hand extension pointing rearwardly from the braking lever support element is disposed on the braking lever support element for the support of the hand.

In order to make a simple fastening and possibly an exchange of the hand extension possible, it is favorable in this connection if the hand extension is fastened detachably to the braking lever support element by means of bores formed in the braking lever support element.

For individual adaptation to the hands of a rider it is furthermore favorable in this connection if the hand extension is designed as a shaped element being adapted to at least part of a palm.

Therefore it is furthermore advantageous if the hand extension comprises finger depressions on its lower side opposite to the palm. In this fashion the hand extension can be grasped by at least part of the hand, while the other part of the hand grasps the hand braking lever.

In order to make a comfortable grasping of the hand braking lever possible, the manual extension is substantially disposed above the braking lever support element in form-fit fashion to a braking lever body of a hand braking lever disposed on the braking lever support element.

In order to fasten the racing-type handlebar to the extension and for the potential fastening of an aero-type handlebar to the racing-type handlebar it proves to be favorable if the extension connection piece has a length of 5 to 12 cm, preferably 8 cm.

For the fastening of the hand extension and for the unproblematical accessibility of the lower handlebar holding grip element it is advantageous if the length of the braking lever support element corresponds approximately to the maximum height of the hand extension. If an aero-type handlebar is to be fastened to an embodiment of the bicycle handlebar according to the invention, it proves to be favorable if a connecting bridge is disposed between the upper handlebar portions or lower handlebar portions designed on both sides to the extension connecting piece to receive the aero-type handlebar. The arrangement of the connecting bridge between the free ends of the lower handlebar portions is especially favorable. The aero-type handlebar can thus be fastened not only to the extension connection piece, but also to the connecting bridge disposed transversely to the bicycle. The grooving of the extension connection piece can be effected almost across its entire length for the twist-proof fastening of the aero-type handlebar.

In a further embodiment of the bicycle handlebar according to the invention the lower handlebar portions are forwardly and inwardly extended to form an aero-type handlebar. In this fashion, the aero-type handlebar is designed as an integrated component of the bicycle handlebar.

It is advantageous both in the bicycle handlebar according to the invention and in known bicycle handlebars, if a pad is at least disposed in places on the bicycle handlebar, the pad being designed as a shock-absorbing attachment, which is at least disposed on one side of the bicycle handlebar facing a palm. In this fashion, impacts trasmitted by the handlebar to the rider are better absorbed and an easier riding is possible. A mounting of the attachment on the lower handlebar holding grip element is in particular of advantage, since a maximum pressure acts on the hand in this posture.

If the attachment is detachably fastened to the bicycle handlebar, it can be disposed at the most different bicycle handlebar portions depending upon the grip position. The fastening of the attachment can, e.g. be effected via a type of Velcro fastener.

A pasting of the attachment is also favorable, it being also possible to wrap it with a handlebar strap.

In order to make a shape of the attachment possible, which is comfortable for the hand, it is advantageous if the attachment has a greater radius of curvature along the bicycle handlebar than vertically to the same.

It is furthermore favorable in this connection so that shocks can also be absorbed in the case of shocks succeeding each other at short intervals due to a bumpiness of the road, if the attachment is formed of a material with a rapid restoring ability. Various plastics or similar materials have e.g. this ability.

SUMMARY OF THE DRAWING

The solutions suggested according to the invention and advantageous examples of embodiment of it are further explained and described by means of the Figures represented in the drawings.

DESCRIPTION OF THE PREFERRED EMBODIMENT

Figure 1:
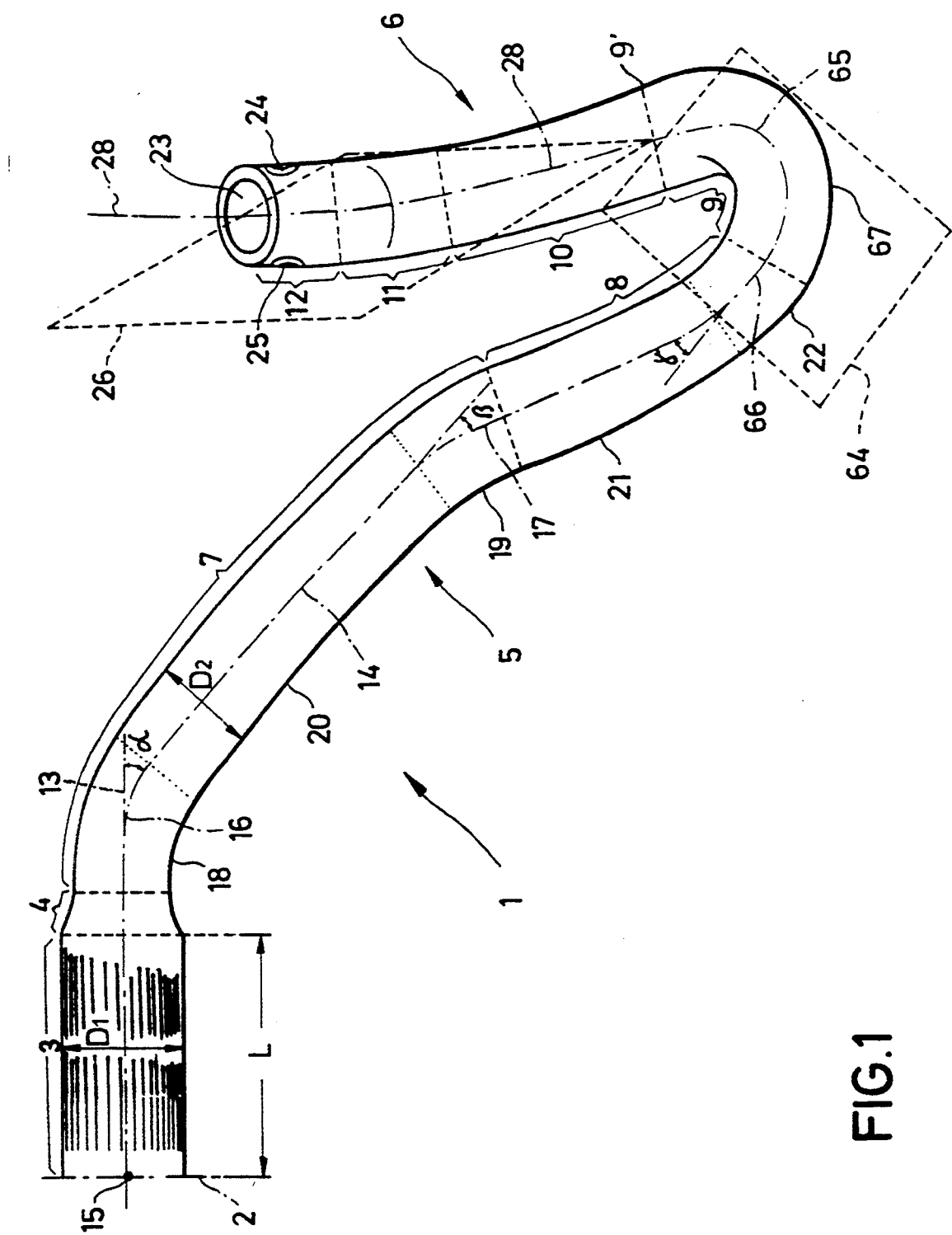
FIG. 1 shows a rear view of the bicycle handlebar according to the invention.

The bicycle handlebar according to the invention is represented with a right half in FIG. 1. The left half (not shown) is designed symmetrically to the represented half, the axis of symmetry being characterized with the reference numeral 2. The represented part of the bicycle handlebar 1 comprises an extension connection piece 3, an upper handlebar grip portion 5 and a lower handlebar grip portion 6.

The extension connection piece 3 and the remaining parts of the bicycle handlebar are made from a pipe and have a diameter D1. It extends substantially across a length L along a horizontal axis 13. The total length of the extension connection piece results due to the design symmetrical to the axis of symmetry 2 with 2L.

The upper handlebar grip portion 6 is connected directly to the extension connection piece 3 via a connecting portion 4. The connecting portion 4 is conically designed, the side facing the extension connection piece 3 having a diameter D1 and the side facing the upper handlebar grip portion 5 having a smaller diameter D2. Upper handlebar grip portion 5 and lower handlebar grip portion 6 and a curved member 9 disposed between them are substantially designed with the diameter D2.

The upper handlebar grip portion 5 extends from the connecting portion 4 outwardly and downwardly with respect to the extension connection piece 3. The upper handlebar grip portion comprises an upper holding grip portion 7 and a lateral holding grip portion 8. The upper holding grip portion 7 is allocated to the connecting portion 4 and connected with the same via a curved end 18. The end bend 18 has a longitudinal axis 16, which extends at its end allocated to the connecting portion 4 tangentially to the horizontal direction 13 and extends at its other end downwardly with respect to the horizontal direction 13 at an angle α. A straight partial section 20 of the upper holding grip element 7 adjoins the end bend or curve end 18. The partial section 20 has a longitudinal axis 14 which extends downwardly at an angle α with respect to the horizontal 13 in continuation of the end of the curved end 18 allocated to it.

On the side opposite to the curved end 18 the upper holding grip element 7 has a curved end bend 19. Its longitudinal axis 17 extends at the end of the curved end 19 allocated to the partial section 20 tangentially to the longitudinal axis 14 and is pivoted downwardly at an angle β with respect to the longitudinal axis 14 at its other end. The curved ends 18 and 19 are designed substantially with the same length along their longitudinal axis 16 and 17.

The lateral holding grip element 8 adjoins the upper holding grip element 7. It has a straight partial section 21, which directly adjoins the curved end 19 and also extends downwardly at the angle B with respect to the longitudinal axis 14 of the partial section 20. On the side of the lateral holding grip element 8 opposite to the curved end bend 19 it has a curve end or end bend 22 whose longitudinal axis 66 is upwardly directed at an angle γ relative to the direction of the longitudinal axis of the straight partial section 21 at its end opposite to the straight section 21.

A plane 64 is also represented pivoted upwardly relative to the longitudinal axis of the straight partial section 21 of the laterall holding grip element 8 at the angle γ. The longitudinal axis 5 of the curved member 9 also extends in this plane 64. The curved member 9 extends downwardly from the lateral holding grip element 8 and bent outwardly and forwardly.

The curved member 9 comprises the lowest point 67 of the bicycle handlebar 1, this point being on a parallel to the horizontal 13. The lower handlebar grip portion 6 adjoins the end 9' of the curved member 9 opposite to the lateral holding grip element 8. The lower handlebar grip portion 6 comprises a sprint-type holding grip element 10, a lower handlebar holding grip element 11 and a braking lever support element 12. The sprint-type holding grip element 10 adjoins the curved member 9 directly and in form-fit fashion. In continuation, the lower handlebar holding grip element adjoins the curved member and the braking lever support element 12 adjoins the lower handlebar holding grip element 11 all of which have a common longitudinal axis 28 which is disposed in a plane 26. Accordingly, the sprint-type holding grip element 10, the lower handlebar holding grip element 11, and the braking lever support element 12 are aligned along this plane. The plane 26 extends inwardly at an acute angle and in inclined fashion to the axis of symmetry or vertical 2. The entire lower handlebar grip portion 6 thus extends forwardly and inwardly from the curved member 9 and at the same time bent in upward fashion.

The braking lever support element 12 is disposed in such fashion that the longitudinal axis 28 emerging from its free end 23 is bent rearwardly and outwardly at an acute angle with respect to the vertical 2. Bores 24 and 25 are disposed laterally in the braking lever support element 12.

Figure 2:
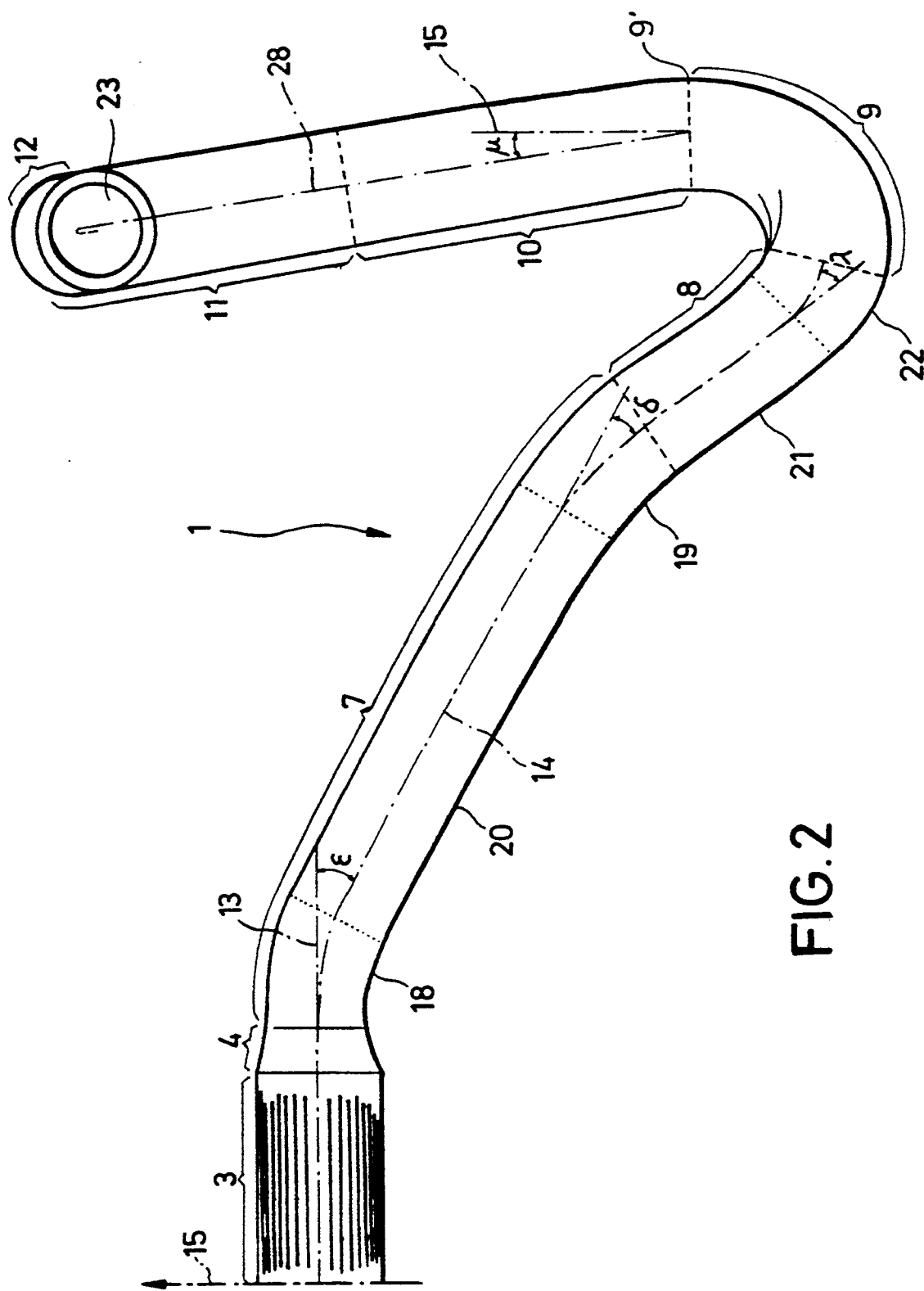
FIG. 2 shows a top view of the bicycle handlebar according to the invention.

The top view of the bicycle handlebar is represented in FIG. 2. The same parts are provided with the same reference numerals and are only mentioned partly.

The course of the upper holding grip element 7 and the lateral holding grip element 8 with respect to the extension connection piece 3 towards the rear is represented oppositely to the direction of riding 15 in the top view of the bicycle handlebar 1. The straight partial section 20 of the upper holding grip element 7 is rearwardly bent from the extension connection piece 3 at an angle ε with respect to the longitudinal direction of the extension connection piece 3. The straight partial section 21 of the lateral holding grip element 8 extends rearwardly at an angle δ with respect to the longitudinal direction 14 of the upper handlebar grip portion 7 in the representation according to FIG. 2. Its curved end 22 extends in forwardly pivoted fashion at an angle λ with respect to the longitudinal direction of the straight partial section 21.

In this connection, care must be taken that the angles ε, δ and λ result by the projection of the longitudinal axes of upper holding grip element 7 and lateral holding grip element 8 in the horizontal plane which is substantially defined by the directions 13 and 15.

Sprint-type holding grip element 10, lower handlebar holding grip element 11 and braking lever support element 12 are represented after the curved member 9 adjoining the lateral holding grip element 8. It can be recognized in the top view of the bicycle handlebar represented in FIG. 2 that the longitudinal axis 28 which extends in the plane 26 according to FIG. 1 encloses an angle μ with the riding direction 15 and is bent inwardly at this angle in the direction of the extension connection piece 3. It is furthermore represented that the distance of the braking lever support element 12 is greater from a plane placed through the riding direction 15 than the distance of the curved end 19 of the upper holding grip element 7, which is allocated to the lateral holding grip element 8, from this plane.

Figure 3:
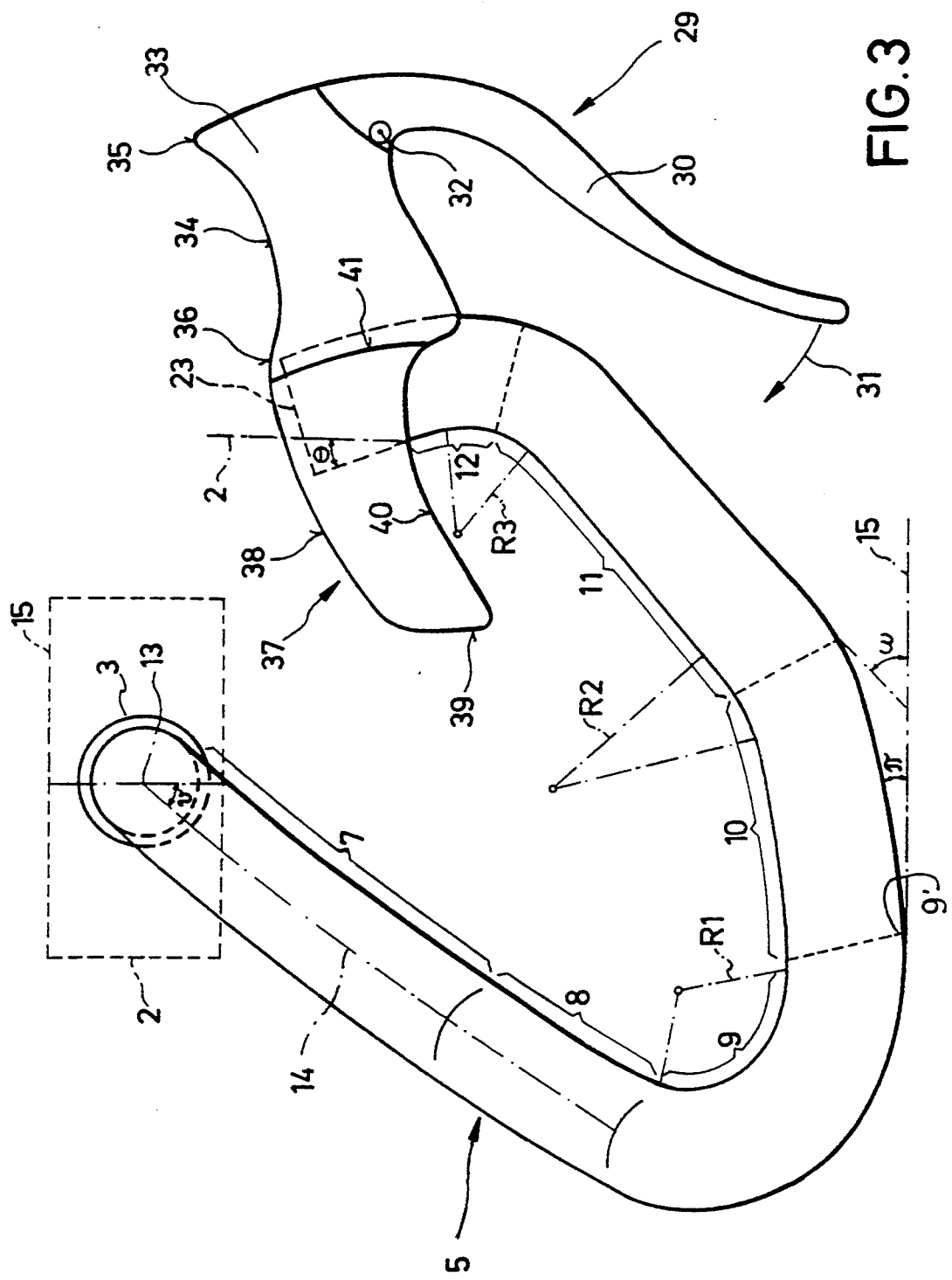
FIG. 3 shows a lateral view of the bicycle handlebar according to the invention.

A lateral view of the bicycle handlebar according to the invention is represented in FIG. 3. The same parts are again provided with the same reference numerals.

It can be recognized in this representation that the projection of the longitudinal axis 14 of upper holding grip element 7 and lateral holding grip element 8 in the plane given by the vertical 2 and the riding direction 15 encloses an angle $\nu$ with the vertical direction. The upper handlebar grip portion 5 is pivoted rearwardly oppositely to the riding direction about this angle.

The curved member 9 adjoins the lateral holding grip element 8 with a smaller radius of curvature R1. The end of the curved member 9 facing the sprint-type holding grip element 10 extends upwardly approximately at an angle $\pi$ with respect to a parallel to the riding direction 15. The connecting area between sprint-type holding grip element 10 and lower handlebar holding grip element 11 has a radius of curvature R1 which is much greater as compared with the radius of curvature R1 of the curved member 9. Apart from the connecting area, both the sprint-type holding grip element 10 and the lower handlebar holding grip element 11 extend substantially rectilinearly, the length of the lower handlebar holding grip element 11 being somewhat greater than the length of the sprint-type holding grip element 10.

The lower handlebar holding grip element 11 extends pivoted upwardly at an angle $\omega$ with respect to the riding direction 15. The angle $\omega$ is approximately four times greater than the angle $\pi$.

The connecting area between the lower handlebar holding grip element 11 and the braking lever support element 12 extends also in curved fashion and has a radius of curvature R3. The same corresponds approximately to the radius of curvature R1 of the curved member 9. The braking lever support element 12 is inclined rearwardly oppositely to the riding direction 15 about an angle $\theta$ with respect to the vertical 2.

As opposed to the representation of FIGS. 1 and 2, a brake 29 and a hand extension 37 are mounted on the braking lever support element 12 in FIG. 3.

The brake 29 comprises a brake actuating lever 30 and a braking lever body 33. The brake actuating lever 30 is rotatably mounted on the braking lever body by means of a bearing 32 and can be pivoted in the direction 31 towards the lower handlebar holding grip element 11.

The braking lever body 33 extends approximately vertically to the longitudinal axis of the braking lever support element 12 and is pivoted upwardly approximately about the angle $\alpha$ with respect to the riding direction. The braking lever body 33 is formed by a saddle valley 34 and two saddle peaks 35 and 36 terminating it forwardly and rearwardly in the riding direction. The rear saddle peak 36 is disposed on the free end 23 of the braking lever support element 12 and before the same approximately in riding direction.

The free end 23 of the braking lever support element 12 is completely closed by the hand extension 37. The same extends with its upper side 38 in form-fit fashion to the braking lever body 33. Its front end 41 is likewise disposed in form-fit fashion in continuation of the braking lever body 33, this end extending in the direction of the lower handlebar holding grip element 11 along the braking lever support element 12. The upper side 38 has a slight convex curvature, the opposite lower side 40 of the hand extension 37 having a similar concave, but larger curvature. The hand extension 37 is closed at its rear end 39 opposite to the front end 41 by an almost vertical line to connect upper side 38 and lower side 40.

Figure 4:
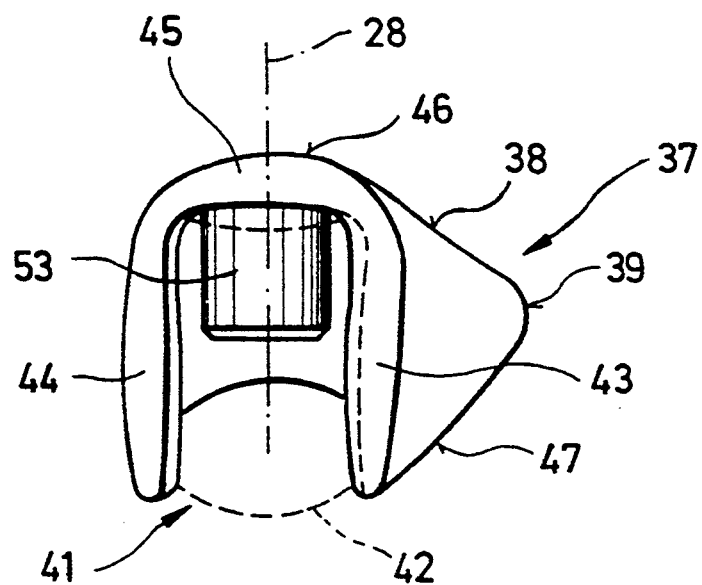
FIG. 4 shows a front view of the hand extension for the hand braking lever.

A front view of the hand extension 37 is represented in FIG. 4. Its front side 41 has a substantially rectangular opening which is surrounded by a righthand and a lefthand bordering 43 and 44 and an upper termination 45. A substantially cylindrical bore of the hand extension 37 is accessible through this opening. A pipe with a pipe cross-section 42 can be inserted into this bore from the lower side of the hand extension 37 up to the upper termination 45. A cylindrical section 53 projects from the upper termination 45 into the cylindrical bore, onto which the corresponding pipe can be slipped. The insert cylinder 53 and the bore formed in the hand extension 37 are designed concentrically to the longitudinal axis 28 of the braking lever support element 12 according to FIG. 1.

The upper termination 45 has a convexly curved upper side 46 which extends in the direction of the rear end 49 of the hand extension 3, the height decreasing along the surface 38. The lower edge 47 of the hand extension 37 also extends in the direction of the rear end from the lower side of the righthand bordering 43.

Figure 5:
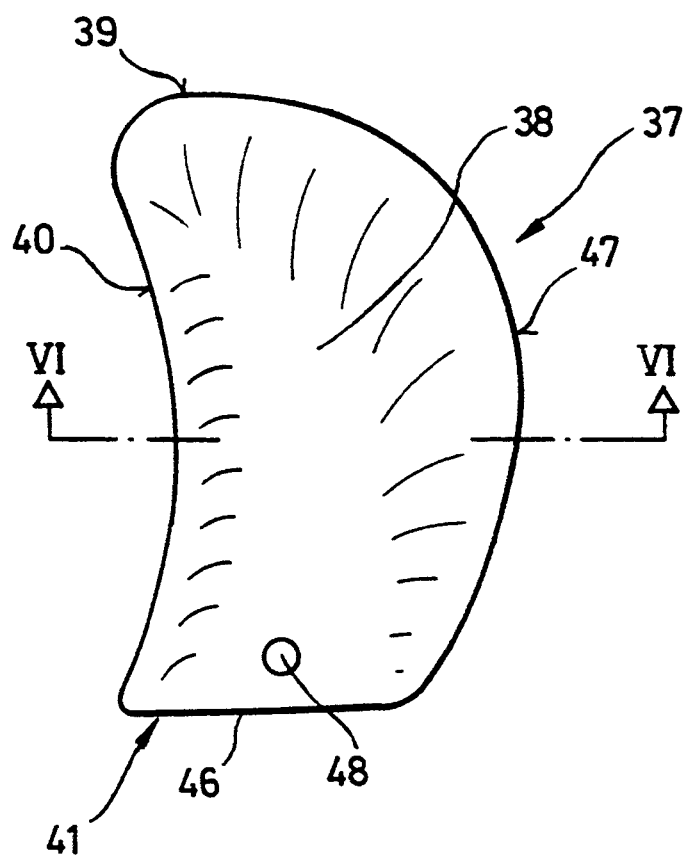
FIG. 5 shows a top view of the hand extension.

A top view of the hand extension 37 is represented in FIG. 5. The surface 38 is limited by the line 46, the side lines 40 and 47 and the rear end line 39. The line 46 is of rectilinear design and extends above the opening formed in the front end 41 according to FIG. 4. The side line 47 corresponds to the lower edge of the hand extension 37 and is outwardly curved in convex fashion. In continuation of the curvature the rear end 39 is disposed. The same passes over into the side line 40 with a narrow curvature, which has a curvature similar to the side line 47, this curvature being, however, concavely designed with respect to the hand extension 37. A bore 48 is disposed near the front end 41 in the upper side 38 approximately centrically to the transverse extension.

Figure 6:
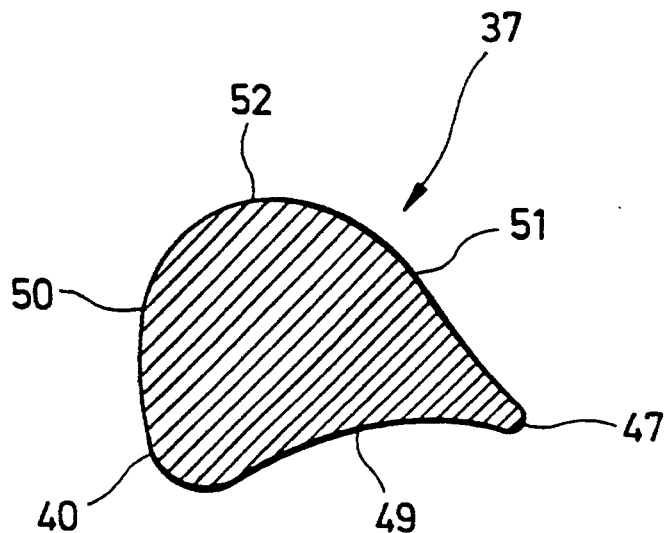
FIG. 6 shows a section along line VI—VI of FIG. 5.

A section along line VI—VI of FIG. 5 is represented in FIG. 6. The lower side 49 is slightly concavely curved in the direction of the hand extension 37. It has a lower edge 47 at one end, which tapers relatively acutely and which has a very small radius of curvature. At the other end it has a lower edge 40 which is rounded to a greater extent and provided with a greater radius of curvature. The righthand side 51 of the hand extension 37 extends from the lower edge 47 to the upper side 52. The righthand side 51 extends approximately rectilinearly and at an angle of about 45° between lower edge 47 and upper side 52. The upper side 52 is curved, one side of the righthand side 51 and a side which is bent to a greater extent being allocated to the lefthand side 50 of the hand extension 37. The left hand side 50 extends between the lower edge 40 and the upper side 52 and extends almost vertically with a weak line curved convexly outwardly with respect to the hand extension 37.

Figure 7:
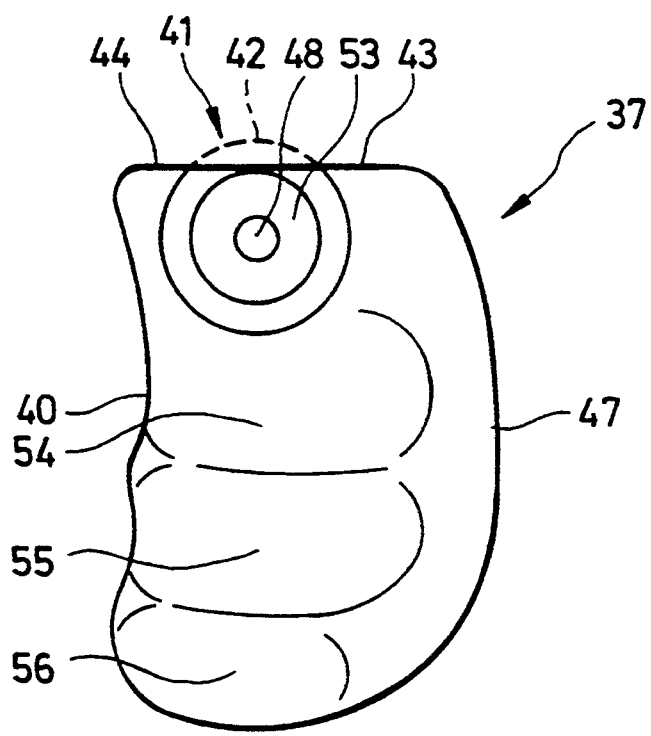
FIG. 7 shows a view from below of the hand extension.

A view from below of the hand extension 37 is represented in FIG. 7. The lower sides of the righthand and lefthand bordering 43 or 44 of FIG. 4 are represented at the front end 41. The bore disposed at this front end comprises the insert cylinder 53 and a fastening bore 48 according to FIG. 5. A pipe 42 can be inserted into the bore.

In accordance with the representation of FIG. 5 the lefthand side line 40 is curved substantially concavely and the side line 47 is bent convexly with respect to the hand extension 37. Finger depressions 54, 55 and 56 at the lower side of the hand extension 37 are accessible from the lower side. The finger depressions extend substantially from the side depression 40 almost up to the opposite side line 47.

Figure 8:
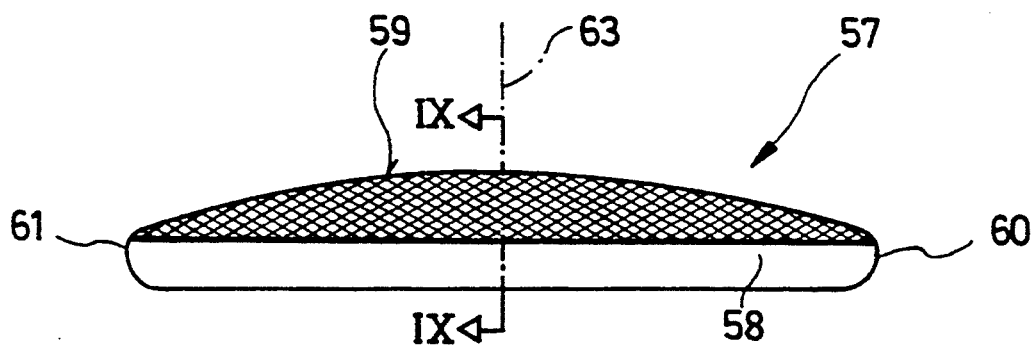
FIG. 8 shows a pad to be supported by a bicycle handlebar.

A pad 57 is represented in FIG. 8. The pad 57 has a slightly curved upper side 59 which is, e.g. designed symmetrically to an axis of symmetry 63 and is designed with decreasing height in the direction of the ends 60 and 61. The pad 57 has a pad cavity extending in longitudinal direction and designed for receiving a handlebar pipe at the lower side 58.

Figure 9:
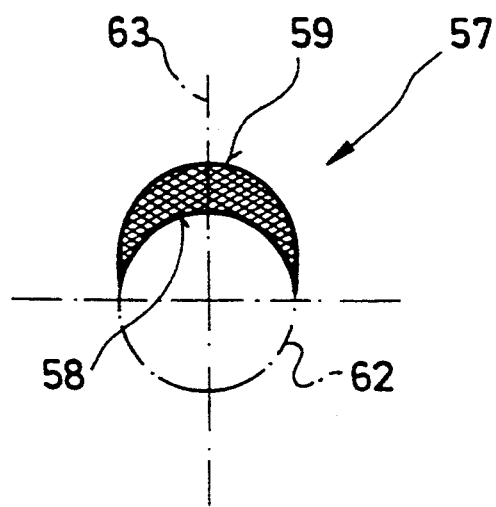
FIG. 9 shows a section along line IX—IX of FIG. 8.

A sectional representation along the line IX—IX of FIG. 8 is represented in FIG. 9. The pad 57 has a sickle-shaped cross-section limited by the lower side 58 and the upper side 59. A handlebar pipe 62 is allocated to the lower side 58, which is partly encompassed by the pad 57. The lateral portions of the upper side 59, which extend in the direction of the handlebar, extend approximately tangentially to the sides of the handlebar 62 and are designed symmetrically to the axis 63 in this example of embodiment.

I claim:

1. A bicycle handlebar comprising a horizontal extension connection piece (3) and at least first and second handlebar segments disposed symmetrically on respectively opposite sides of said horizontal extension connection piece, each of said segments including an upper handlebar grip (5) extending from said horizontal extension connection piece in a rearwardly and downwardly direction therefrom and a lower handlebar grip (6) adjoined to said upper handlebar grip and extending forwardly and upwardly with respect to said horizontal extension connection piece, said upper handlebar grip including a first gripping portion (7) extending downwardly at a first angle ($\alpha$) relative to said horizontal extension connection piece and a second lateral gripping portion (8) extending downwardly at a second angle ($\alpha + B$) relative to said horizontal extension connection piece, said second angle being greater than said first angle.

2. A bicycle handlebar according to claim 1, wherein said first gripping portion (7) of said upper handlebar grip (5) includes a first curved end portion (18) which connects to said horizontal extension connection piece (3) and a second curved end portion (19) which connects to said second lateral gripping portion (8).

3. A bicycle handlebar according to claim 2, wherein said horizontal extension connection piece (3) extends along a first longitudinal axis (13), said first gripping portion (7) extends along a second longitudinal axis (14), and said second lateral gripping portion (8) extends along a third longitudinal axis (17), said first curved end portion (18) being rotated clockwise from said horizontal extension connection piece so that said second longitudinal axis is rotated clockwise with respect to said first longitudinal axis, said second curved end portion (19) also being rotated clockwise from said first gripping portion so that said third longitudinal axis is rotated clockwise with respect to said first longitudinal axis.

4. A bicycle handlebar according to claim 3, wherein said second longitudinal axis extends downwardly from said first longitudinal axis at said first angle ($\alpha$) and said third longitudinal axis extends downwardly from said second longitudinal axis at a third angle ($\beta$), said first angle and said third angle being equal.

5. A bicycle handlebar according to claim 1, wherein said first angle ($\alpha$) is about 34° to 40°.

6. A bicycle handlebar according to claim 4, wherein said second lateral gripping portion (8) includes a third curved end portion (22) which connects to a curved member (9) which connects to said lower handlebar grip (6).

7. A bicycle handlebar according to claim 3, wherein said second lateral gripping portion (8) extends rectilinearly along said second longitudinal axis (17).

8. A bicycle handlebar according to claim 6, in which a transverse axis (15) extends through said horizontal extension connection piece (3) and is perpendicular to said longitudinal axis (13), said transverse axis (15) and said first longitudinal axis (13) forming a first horizontal plane; said curved member (9) being disposed in a second plane (64) extending at a fourth angle to said first horizontal plane, said fourth angle being determined by a curvature of said third curved end portion (22).

9. A bicycle handlebar according to claim 8, wherein said curved member (9) connects to said lower handlebar grip (6) at a fourth end portion (9') which is disposed pointing forwardly and inwardly with respect to said horizontal extension connection piece.

10. A bicycle handlebar according to claim 9, wherein said fourth end portion (9') of said curved member (9) is upwardly directed with respect to said first horizontal plane at a fifth angle ($\pi$) of about 5 to 10 degrees.

11. A bicycle handlebar according to claim 10, wherein said lower handlebar grip (6) includes a sprint-type gripping element (10) and an adjoined second gripping element (11), said sprint-type gripping element (10) extending from said fourth end portion (9') of said curved member (9) at said fifth angle ($\pi$) and said second gripping element (11) extending upwardly from said first sprint-type gripping element (10) at a sixth angle (w) with respect to said horizontal plane, said sixth angle (w) being greater than said fifth angle ($\pi$).

12. A bicycle handlebar according to claim 11, wherein said sprint-type gripping element (10) and said second gripping element (11) are disposed in a common third lower handlebar plane (26) which is bent inwardly towards said horizontal extension connection piece.

13. A bicycle handlebar according to claim 12, wherein said third lower handlebar plane (26) forms a seventh angle ($\mu$) with respect to said transverse axis (15) and said seventh angle being approximately 0–16 degrees.

14. A bicycle handlebar according to claim 13, wherein said second gripping element (11) extends upwardly at an eighth angle (w − $\pi$) with respect to said sprint-type gripping element (10), said eighth angle being approximately 30°–40°.

15. A bicycle handlebar according to claim 12, wherein said lower handlebar grip (6) includes a braking lever support element (12) extending from said second gripping element (11).

16. A bicycle handlebar according to claim 15, wherein said curved portion (9) has a first radius of curvature (R1), said sprint-type gripping element (10) and said second gripping element (11) form a second radius of curvature (R2), and said second gripping element (11) and said braking lever support element (12) form a third radius of curvature (R3); said second radius of curvature being equal to or greater than said third radius of curvature.

17. A bicycle handlebar according to claim 15, wherein said braking lever support element (12) is disposed in said third lower handlebar plane (26).

18. A bicycle handlebar according to claim 17, wherein said braking lever support element (12) includes a fee end (23) that points upwardly and is rearwardly and outwardly inclined at a ninth acute angle ($\theta$) to a second transverse axis (2) which is perpendicular to said first horizontal plane.

19. A bicycle handlebar according to claim 15, wherein said braking lever support element (12) is disposed a greater distance away from said horizontal extension connection piece (3) than that of said second lateral gripping portion (8).

20. A bicycle handlebar according to claim 1, wherein said first gripping portion (7) of said upper handlebar grip (5) has a length corresponding approximately to the width of a hand.

21. A bicycle handlebar according to claim 2, wherein said first gripping portion (7) of said upper handlebar grip (5) includes a slightly downward bend between said first curved end portion (18) and said second curved end portion (19).

22. A bicycle handlebar according to claim 15, wherein a hand extension (37) is disposed on said braking lever support element (12) for support of a rider's hand, said hand extension (37) pointing rearwardly from said braking lever support element (12).

23. A bicycle handlebar according to claim 22, wherein said hand extension (37) is detachably affixed to said braking lever support element (12).

24. A bicycle handlebar according to claim 22, wherein an upper surface of said hand extension (37) is shaped so as to be adapted to support at least a part of a palm of a rider's hand.

25. A bicycle handlebar according to claim 24, wherein said hand extension (37) has a lower surface opposite said upper surface which includes finger depressions.

26. A bicycle handlebar according to claim 22, wherein said hand extension (37) is disposed above said braking lever support element (12) and is joined to a braking lever body (33) which has a braking lever (29) depending therefrom.

27. A bicycle handlebar according to claim 1, wherein said horizontal extension connection piece (3) has the length of about 5 cm. to 12 cm.

28. A bicycle handlebar according to claim 23, wherein said braking lever support element (12) has a length and said hand extension (37) has a maximum height, said length of said braking lever support element (12) corresponding approximately to said maximum height of said hand extension (37).

29. A bicycle handlebar according to claim 1, wherein a connecting bridge is disposed between said first and second segments for receiving an arrow-type handlebar.

30. A bicycle handlebar according to claim 1, wherein said lower handlebar grip (6) extends forwardly and inwardly to form an arrow-type handlebar.

31. A bicycle handlebar according to claim 1, wherein said first angle ($\alpha$) is about 37°.

32. A bicycle handlebar according to claim 10, wherein said fifth angle ($\pi$) is about 8°.

33. A bicycle handlebar according to claim 14, wherein said eighth angle ($W-\pi$) is about 35°.

34. A bicycle handlebar according to claim 1, wherein said second lateral gripping portion (8) has a length corresponding approximately to a width of a hand.

35. A bicycle handlebar according to claim 11, wherein said sprint-type holding grip element (10) has a length corresponding to a width of a hand.

36. A bicycle handlebar according to claim 1, wherein said second gripping element (11) has a length corresponding approximately to a width of a hand.

37. A bicycle handlebar according to claim 1, wherein said horizontal extension connection piece (3) has a length of about 8 cm.

38. A bicycle handlebar according to claim 1, wherein a connecting bridge is disposed between said lower handlebar grip (6) formed on both sides of said horizontal extension connection piece (3) to receive an arrow-type handlebar.

* * * * *